United States Patent

[11] 3,611,020

[72] Inventor William L. Cotter
Beverly, Mass.
[21] Appl. No. 862,735
[22] Filed Oct. 1, 1969
[45] Patented Oct. 5, 1971
[73] Assignee Itek Corporation
Lexington, Mass.

[54] READOUT OF GAS CELL
10 Claims, 4 Drawing Figs.
[52] U.S. Cl. ..................................................... 315/169,
313/214
[51] Int. Cl. ............................................... H05b 37/00
[50] Field of Search ........................................... 324/20-28;
315/129-136, 169, 84.5, 84.6; 328/125, 126;
313/214; 340/173

[56] References Cited
UNITED STATES PATENTS
2,573,373 10/1951 Wales ........................... 315/84.6
3,042,823 7/1962 Willard ......................... 315/169

OTHER REFERENCES
C. R. Dougherty and R. D. Smith–Measuring the Delay - times of Neons–Electronic Design–12(7)– Mar. 30, 1964– pp. 34- 39.

Primary Examiner—Michael J. Lynch
Attorneys—Homer O. Blair, Robert L. Nathans and William C. Roch ABSTRACT: A system for determining whether a particular gas cell in a matrix of gas cells forming a display or data storage system is firing. When a gas cell fires, the uniform distribution of electric field gradients in the cell changes, and most of the voltage drop across the cell appears closely adjacent to the cathode in a region called the cathode fall region. If a particular gas cell were firing, a cathode fall region would be present. The presence of the cathode fall region is tested for by positioning a readout electrode closely adjacent to the cathode. The anode is pulsed, and, if a cathode fall region is present, an output pulse can be detected from the readout electrode. If no cathode fall region is present, the pulsing of the anode will have no effect on the output from the readout electrode.

WILLIAM L. COTTER
INVENTOR.

BY William C. Roch

ATTORNEY.

3,611,020

1

READOUT OF GAS CELL

BACKGROUND OF THE INVENTION

The present invention relates generally to display or data storage systems which are comprised of a matrix of gas cells. More particularly, the invention relates to a novel readout system whereby a selected gas cell in the matrix may be tested to determine if that gas cell is presently firing.

One method for determining whether a particular gas cell is firing is known, but it suffers from an inherent disadvantage. This known system is to pulse a particular X line on which the gas cell being tested is located. The Y line on which the particular gas cell is located is then monitored for a predetermined increase in current, which would indicate that the gas cell being tested is indeed firing. This normal increase in current is a sufficient output signal if only a small number of cells are involved. The problem with this system is that the Y line which is monitored may contain a large number of firing gas cells, for example 50, and therefore the Y line would carry the firing current for all 50 cells. If this were the case, the slight current pulse on the Y line due to the pulsing of the one particular X line would only be a small fraction of the total current on the Y line, and therefore would be very difficult to detect. Even if detection were possible, this normal increase in current due to the pulsing of one gas cell is not of a sufficient magnitude to directly drive output logic circuitry without amplification, which would require a separate amplifier for each Y line.

SUMMARY OF THE INVENTION

In accordance with a preferred embodiment, a novel bistable gas cell is nondestructively read out with a good signal-to-noise ratio regardless of the size of the matrix of cells. Readout is accomplished for a particular gas cell by positioning a readout electrode within the cell closely adjacent to the cathode and slightly farther away from the anode than is the cathode. If the gas cell is firing, most of the voltage drop in the cell is across the cathode fall region which is closely adjacent to the cathode. The anode is then pulsed. If no cathode fall region is present, the voltage pulse is insufficient to obtain an output pulse on the readout electrode. However, if the gas cell is firing, the voltage pulse will set up an additional secondary discharge to the readout electrode which can be detected to determine if the gas cell is firing. This system is extremely useful in display or data storage systems comprised of a matrix of gas cells wherein it is desirable to determine whether a particular gas cell in the matrix is firing at a given time. In data storage systems the invention allows the beneficial function of reading out the information in the matrix without destroying the recorded information, as is normally the case with magnetic storage matrices. Although the preferred embodiment is described as operating in a DC mode, it should be appreciated that the teachings of this invention may readily be applied to an AC mode embodiment.

DESCRIPTION OF A PREFERRED EMBODIMENT

Figure 1:
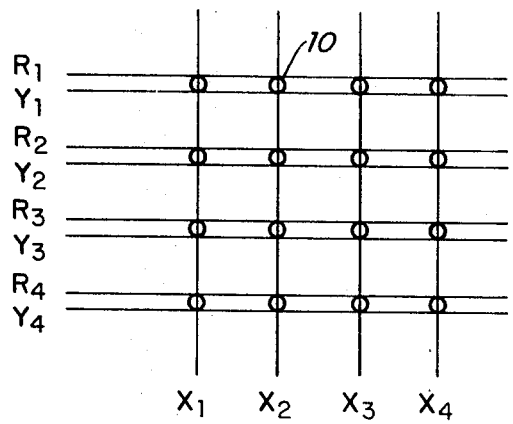
FIG. 1 illustrates a display matrix of 16 gas cells.

Referring to FIG. 1, there is shown a matrix of 16 133 gas cells 10. Each gas cell has an X line which is connected to its anode, a Y line which is connected to its cathode, and an R line which is connected to the readout electrode of each cell. As shown, the X, Y, and R lines are connected to the electrodes in the cells which lie along each respective line. A $Y_n$ and $R_n$ line may be further connected to each other through a suitable impedance to reference the $R_n$ line relative to the $Y_n$ line. Although a matrix of 16 gas cells is shown, any size matrix may be desired, and a typical display matrix might consist of approximately $5\times10^5$ gas cells.

Figure 2:
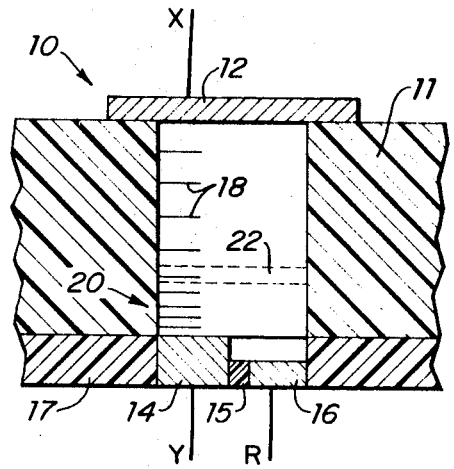
FIG. 2 illustrates one gas cell from the matrix of gas cells.

FIG. 2 illustrates a typical gas cell of the matrix shown in FIG. 1. The gas cell has an anode 12, a cathode 14 and a readout electrode 16. The readout electrode 16 is positioned adjacent to the cathode 14 and is slightly further from the anode 12 than is the cathode 14.

In one embodiment, the main chamber for the gas cell might be formed as simply a round hole in a supporting body 11. The cathode 14 and readout electrode 16 may be supported by a substrate 17 which covers one side of the body 11. The cathode 14 and readout electrode 16 are electrically separated from each other by a partition 15.

If the present invention were used with a method of firing a gas cell such as is disclosed in U.S. Pat. application Ser. No. 862,866, filed Oct. 1, 1969, for "Split Electrode Gas Cell" by William L. Cotter, then a signal to the cathode would not be required to fire the cell, and each cathode might be connected to ground. In that embodiment, each $R_n$ line would be tied through an impedance to ground.

FIG. 2 also illustrates two conditions present in the gas cell when it is firing. Equal field strengths of an electric field across the cell are represented by lines 18. When the gas cell is not firing, the electric field gradients are distributed substantially equally along the gas cell from the anode to the cathode. When the gas cell is firing, the electric field gradients are narrowly "compressed" near the cathode, as illustrated by the lines 18 in FIG. 2, to form a cathode fall region 20, across which most of the voltage drop of the cell appears.

Figure 3:
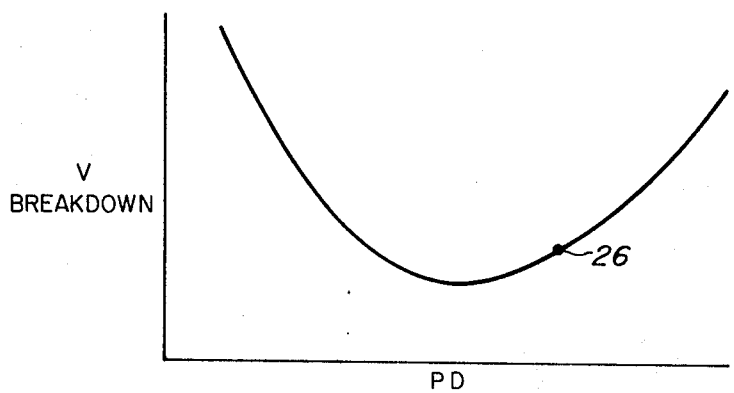
FIG. 3 is a curve which illustrates the operation of a gas cell, and is useful in explaining the theory of this invention.

The operation of the gas cell will now be explained. FIG. 3 illustrates a Paschen curve for a particular gas-electrode combination in a typical gas cell. This curve correlates the breakdown voltage across the cell to the product of the pressure in the cell times the distance between the anode and the cathode. The PD product of a typical gas cell would be on the positively sloped region of the curve as at point 26. Referring back to FIG. 2, it should be noted that the PD product of the cathode to anode is greater than the PD product of the cathode to anode, and therefore the breakdown voltage to the readout electrode would be higher than the breakdown voltage to the cathode.

Figure 4:
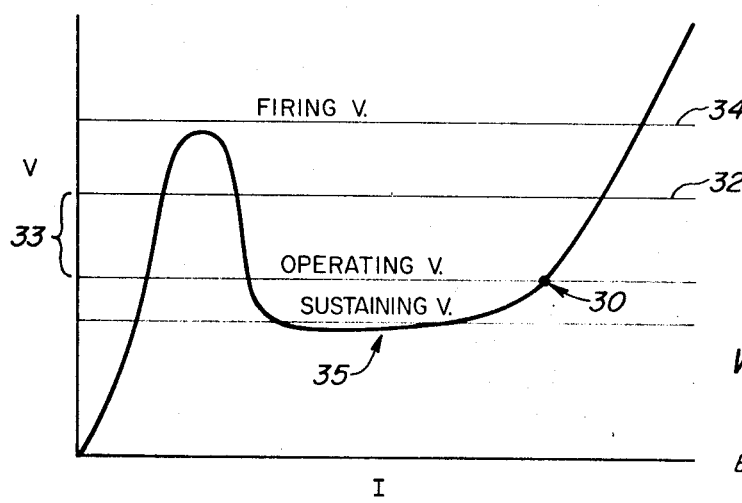
FIG. 4 is a curve which illustrates the operation of a gas cell, and is useful in explaining the operation of this invention.

FIG. 4 illustrates a voltage versus current curve for a typical gas cell. As shown, the initial firing voltage is nearly twice the operating voltage utilized to maintain a discharge in the gas cell. The voltage lines indicated in FIG. 4 assume the driving source to be a pure voltage source. If a resistance were in series with each cell, the voltage lines would be drawn with a slope of $1/R_L$, where $R_L$ is the series resistance. The usual operating condition for a cell is either in the normal glow region 35 near the flat bottom of the curve or slightly into the abnormal glow region 30 where the curve takes a positive slope. When a cell assumes a normal operating condition at point 30, the PD product of the readout electrode to anode is too high to cause or sustain a secondary discharge to the readout electrode.

In a normal glow discharge condition, the normal cathode current density is relatively constant and is a function of the cathode material, gas, and gas pressure. The current carried by the cathode will cover an area of the cathode sufficient to satisfy the normal cathode current density. As the current in the cell increases, the area of the cathode covered by the current increases until the entire cathode area is saturated with current. Operation up to this point is in the normal glow region. In the normal glow region the voltage across the cell is relatively constant. When the entire cathode area is saturated with current at the normal cathode current density, an increase in current is accompanied by an increased voltage drop across the cell. The cell is now in a condition of abnormal glow and is operating in the abnormal glow region 30 where the curve takes a positive slope to reflect the increased voltage.

When the cell is in the normal glow region, most of the voltage across the cell appears across a small region in front of the cathode. This region is known as the cathode fall region, and the distance from the cathode over which this potential drop appears is known as the cathode fall length. With this large voltage gradient in front of the cathode, it appears as if there were a virtual anode located at the end of the cathode fall length. In the normal glow region the cathode fall voltage and length is relatively constant. When the discharge enters the abnormal glow region, the cathode fall voltage increases and the cathode fall length decreases. Both effects contribute to a larger voltage gradient in the cathode fall area, and the decrease in cathode fall length has the effect of moving the virtual anode closer to the cathode.

The operating voltage is normally maintained across the cell even when the cell is not firing. The cell is normally fired by applying a positive voltage pulse to the anode and a negative voltage pulse to the cathode, the magnitude of each of the pulses being approximately one-half the difference between the firing and operating voltages. The magnitude of such a pulse is illustrated at 33 in FIG. 4. When a particular cell in a matrix of cells is fired, the voltage pulse to the anode is applied to the appropriate X line, and the voltage pulse to the cathode is applied to the appropriate Y line. The cell may be extinguished by applying a voltage pulse to the cell to bring the total voltage across the cell below the sustaining voltage.

The cell is tested to determine whether it is firing or not by applying a positive voltage pulse to the anode 12 to bring the total voltage across the gas cell to the voltage represented by the line 32 in FIG. 4. Assuming the cell is not firing, this voltage is less than the firing voltage and will not initiate a discharge in the cell. Therefore, if the readout electrode of the cell were monitored, no current pulse would result from the pulsing of the anode. If the gas cell were discharging, most of the potential across the cell would appear across the cathode fall region 20. The cathode fall region would present a virtual anode 22 which would reduce the effective PD product of the readout electrode to anode. As illustrated in FIG. 3, this reduction in the effective PD product would reduce the voltage necessary to cause breakdown across the cell between the anode and readout electrode to a point where a voltage pulse applied to the anode, having a magnitude 33 as illustrated in FIG. 4, would be sufficient to cause a secondary discharge between the anode and readout electrodes. The current carried by the readout electrode before and after this secondary discharge differs by several orders of magnitude, which presents an output pulse on the readout electrode which is clearly discernible above background noise. After the voltage pulse to the anode subsides, the secondary discharge extinguishes without affecting the main discharge.

Readout is therefore affected by applying a positive voltage pulse to the anode and monitoring the readout electrode for a current pulse. If the main discharge is inactive, pulsing the anode will have no effect on the cell and no readout current will be available. However, if the main discharge is active, pulsing the anode will result in a clearly distinguishable pulse which may be monitored from the readout electrode.

In an enlarged embodiment which was built and tested, the anode-to-cathode spacing was 0.4 inch, and the anode-to-readout electrode spacing was 0.55 inch. The gas cell was filled with argon at a pressure of 14 mm. The anode and readout electrode were made of copper, and the cathode was constructed of tin-plated copper. In this embodiment the required firing voltage was 400 volts, and the required sustaining voltage was 200 volts. When the gas cell was firing, the secondary discharge to the readout electrode occurred when the anode-to-readout electrode voltage was 350 volts, and the sustaining voltage for the secondary discharge was approximately 325 volts. With these voltage characteristics, the firing and sustaining voltages from the anode-to-readout electrode are within the range of voltages between the main firing and sustaining voltages for the cell, as would be required for command purposes.

What is claimed is:

1. Apparatus for determining whether an electrical discharge cell is in a state of primary electrical discharge which is maintained by a predetermined sustaining voltage, and including:
   a. said electrical discharge cell having a first sustaining electrode at a first end of the cell, a second sustaining electrode at a second end of the cell opposite said first end, and a readout electrode positioned in the cell adjacent to said second sustaining electrode and a further distance from said first sustaining electrode than is said second sustaining electrode, whereby said further distance between said readout electrode and said first sustaining electrode requires an initiating voltage, to initiate a secondary electrical discharge between said first sustaining electrode and said readout electrode, which is higher than said predetermined sustaining voltage;
   b. means for applying a voltage pulse to said first sustaining electrode having a magnitude which will bring the voltage between said first sustaining electrode and said readout electrode above said initiating voltage to initiate a secondary electrical discharge to said readout electrode if the cell is in a state of primary electrical discharge and which will be insufficient to initiate a secondary electrical discharge to said readout electrode if the cell is not in a state of primary electrical discharge; and
   c. means for detecting an increase in electrical current through said readout electrode cause by said secondary electrical discharge if the cell is in a state of primary electrical discharge, whereby the presence or absence of said increase in electrical current indicates whether or not the cell is in a state of primary electrical discharge.

2. Apparatus as set forth in claim 1 wherein:
   a. said electrical discharge cell is located in a matrix of similar electrical discharge cells,
   b. said matrix includes a separate X electrical connector for each column of cells in said matrix with each X electrical connector connecting the first sustaining electrodes of each cell in the column in which that X electrical connector is located;
   c. said matrix includes a separate R electrical connector for each row of cells in said matrix with each R electrical connector connecting the readout electrodes of each cell in the row in which that R electrical connector is located;
   d. said means for applying a voltage pulse to said first sustaining electrode includes means for applying a voltage pulse to the X electrical connector to which the cell, the state of which is being determined, is connected; and
   e. said means for detecting includes means for detecting an increase in electrical current on the R electrical connector to which the cell, the state of which is being determined, is connected.

3. Apparatus as set forth in claim 2 wherein said predetermined sustaining voltage is a DC voltage.

4. Apparatus as set forth in claim 3 wherein said first sustaining electrode is an anode and said second sustaining electrode is a cathode.

5. Apparatus as set forth in claim 1 wherein said predetermined sustaining voltage is a DC voltage.

6. Apparatus as set forth in claim 1 wherein said first sustaining electrode is an anode and said second sustaining electrode is a cathode.

7. Apparatus for determining whether an electrical discharge cell is in a state of primary electrical discharge which is maintained by a predetermined sustaining voltage, and including: means for testing for the presence of a cathode fall region in the electrical discharge cell caused by a primary electrical discharge in the cell and comprising,
   a. said electrical discharge cell having a sustaining anode at a first end of the cell, a sustaining cathode at a second end of the cell opposite said first end, and a readout electrode positioned in the cell and adjacent said sustaining cathode at said second end of the cell, b. means for applying a positive voltage pulse to said sustaining anode having a magnitude which will initiate a secondary discharge in the cell from said sustaining anode to said readout electrode if the cell is in a state of primary electrical discharge and which will be insufficient to initiate said secondary discharge in the cell if the cell is not in a state of primary electrical discharge, and c. means for detecting an increase in electrical current through said readout electrode caused by said secondary discharge if the cell is in a state of primary electrical discharge, whereby the presence or absence of said increase in electrical current indicates whether or not the cell is in a state of primary electrical discharge.

8. Apparatus as set forth in claim 7 wherein:

a. said electrical discharge cell is located in a matrix of similar electrical discharge cells;

b. said matrix includes a separate X electrical connector for each column of cells in said matrix with each X electrical connector connecting the sustaining anodes of each cell in the column in which that X electrical connector is located;

c. said matrix includes a separate R electrical connector for each row of cells in said matrix with each R electrical connector connecting the readout electrodes of each cell in the row in which that R electrical connector is located;

d. said means for applying a voltage pulse to said sustaining anode includes means for applying a voltage pulse to the X electrical connector to which the cell, the state of which is being determined, is connected; and e. said means for detecting includes means for detecting an increase in electrical current on the R electrical connector to which the cell, the state of which is being determined, is connected.

9. Apparatus as set forth in claim 8 wherein said predetermined sustaining voltage is a DC voltage.

10. Apparatus as set forth in claim 7 wherein said predetermined sustaining voltage is a DC voltage.